United States Patent
Hernandez et al.

(10) Patent No.: US 7,270,758 B2
(45) Date of Patent: Sep. 18, 2007

(54) METHOD TO IMPROVE ABILITY TO PERFORM CMP-ASSISTED LIFTOFF FOR TRACKWIDTH DEFINITION

(75) Inventors: Shawn Marie Collier Hernandez, Gilroy, CA (US); Wipul Pemsiri Jayasekara, Los Gatos, CA (US); Timothy J. Minvielle, San Jose, CA (US); Benjamin Lu chen Wang, Cambridge, MA (US); Howard Gordon Zolla, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 101 days.

(21) Appl. No.: 11/081,222

(22) Filed: Mar. 15, 2005

(65) Prior Publication Data

US 2006/0207966 A1    Sep. 21, 2006

(51) Int. Cl.
  *B44C 1/22*    (2006.01)
(52) U.S. Cl. .................. 216/22; 216/37; 216/40; 216/42; 438/692; 438/697; 29/603; 29/13; 29/603.14; 29/603.18; 360/324.1
(58) Field of Classification Search ............. 29/603.13; 216/22, 37; 438/692; 360/324.1
  See application file for complete search history.

(56) References Cited

U.S. PATENT DOCUMENTS

| | | | |
|---|---|---|---|
| 6,085,406 A | 7/2000 | Garfunkel et al. | 29/603.14 |
| 6,176,005 B1 | 1/2001 | Garfunkel et al. | 29/603.14 |
| 6,958,885 B1* | 10/2005 | Chen et al. | 360/126 |
| 2004/0105195 A1 | 6/2004 | Fontana, Jr. et al. | 360/324.12 |
| 2006/0067009 A1* | 3/2006 | Cyrille et al. | 360/324.1 |

OTHER PUBLICATIONS

IPCOM13530D: Fabrication of self-aligned side-by-side read/write head by using selective dry etching, no date.

* cited by examiner

*Primary Examiner*—Nadine Norton
*Assistant Examiner*—Maki Angadei
(74) *Attorney, Agent, or Firm*—Larry B. Guernsey; Intellectual Property Law Offices

(57) ABSTRACT

A method is presented for fabricating a read head having a read head sensor and a hard bias/lead layer which includes depositing a strip of sensor material in a sensor material region, and depositing strips of fast-milling dielectric material in first and second fast-milling dielectric material regions adjacent to the sensor material region. A protective layer and a layer of masking material is deposited on the strip of sensor material and the strips of fast-milling dielectric material to provide masked areas and exposed areas. A shaping source, such as an ion milling source, is provided which shapes the exposed areas. Hard bias/lead material is then deposited on the regions of sensor material and fast-milling dielectric material to form first and second leads and a cap on each of these regions. The cap of hard bias/lead material and the masking material is then removed from each of these regions.

11 Claims, 8 Drawing Sheets

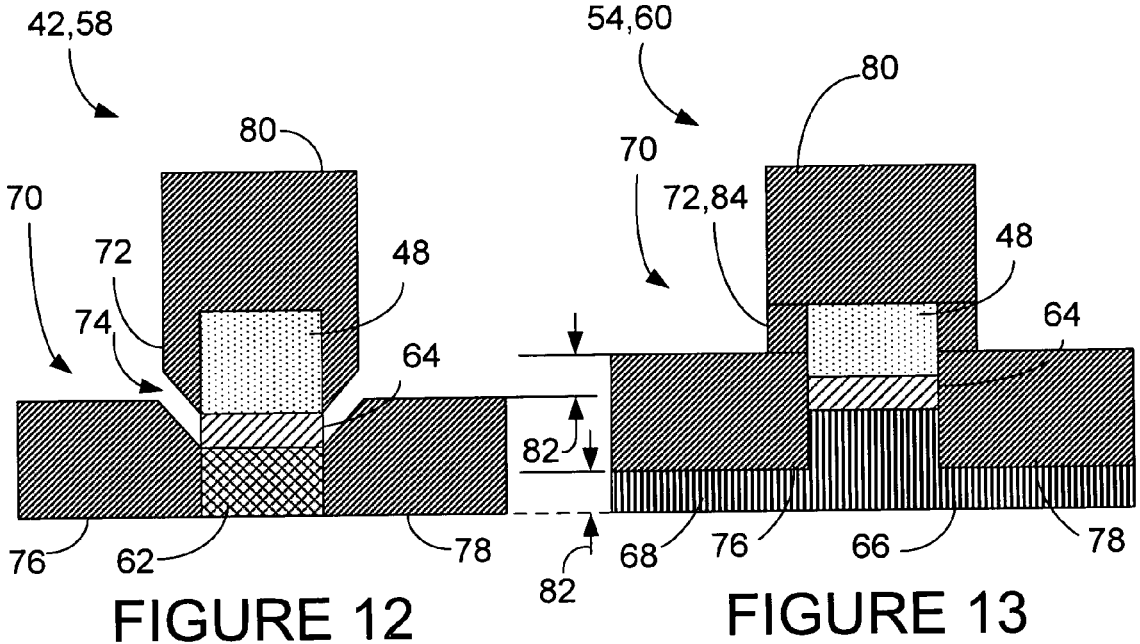
FIGURE 12
(Prior art)
FIGURE 13
(Prior art)
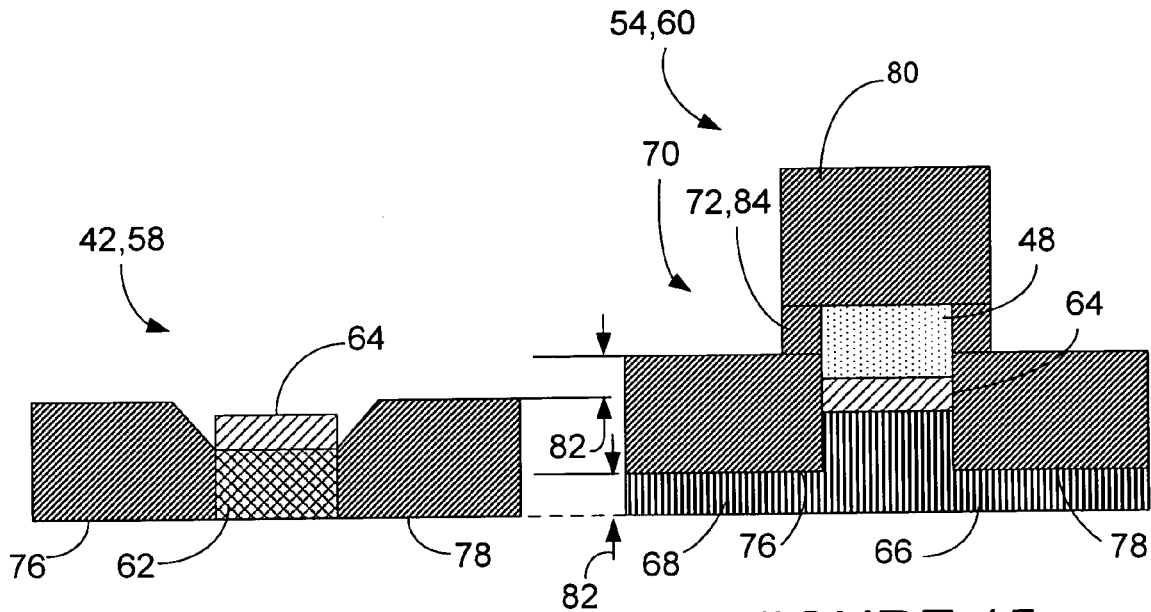
FIGURE 14
(Prior art)
FIGURE 15
(Prior art)

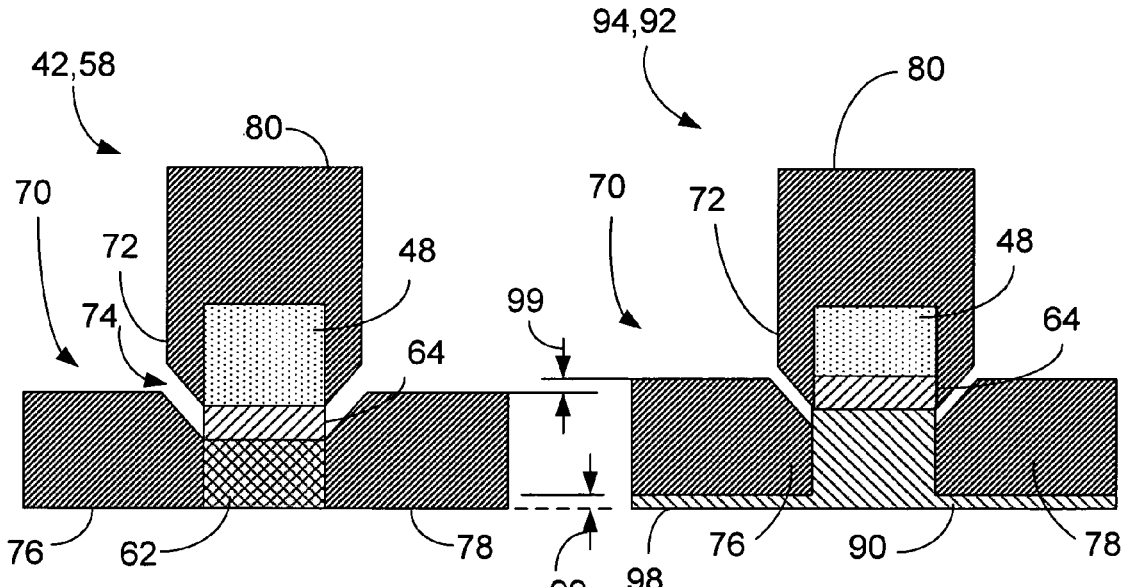
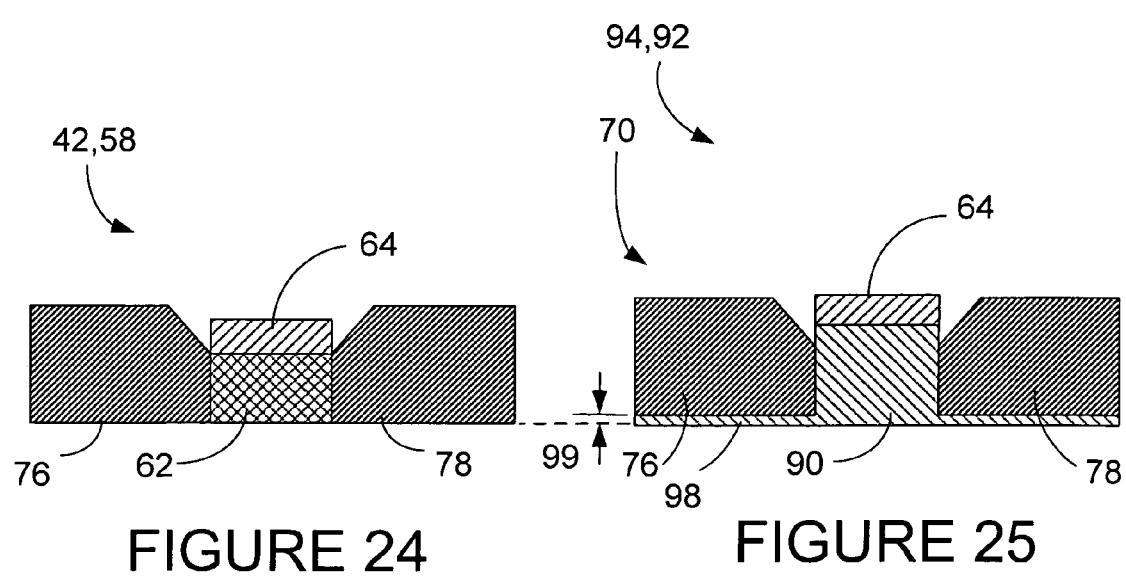

US 7,270,758 B2

METHOD TO IMPROVE ABILITY TO PERFORM CMP-ASSISTED LIFTOFF FOR TRACKWIDTH DEFINITION

BACKGROUND OF THE INVENTION

1. Field of the Invention

The present invention relates generally to magnetic heads for reading data written to storage media, and more particularly to magnetic read heads for disk drives.

2. Description of the Prior Art

In recent years there has been a constant drive to increase the performance of hard disk drives by increasing the areal data storage density of the magnetic hard disk. This is done by reducing the written data track width, such that more tracks per inch can be written on the disk. This naturally requires that the width of the read head be reduced so magnetic field interference from adjacent data tracks is not picked up.

Read sensors, of which one type is referred to as a "spin valve", developed to read trackwidths smaller than 130 nm depend upon the ability to ion mill the sensor to these very small dimensions, and to reliably lift-off the deposited layer materials. A common problem with the fabrication of such small sensors is illustrated in FIGS. 5-15.

The sensor is typically formed of a stack of layers which are generally formed as a region of magnetic material bounded by strips of dielectric or insulating materials. FIG. 5 shows a top plan view of a portion of a wafer 41 as it is being prepared for shaping into a sensor 40. The sensor material region 42 is shown to be bounded by a first dielectric material region 44 and a second dielectric material region 46. These first and second dielectric material regions 44, 46 are chosen to be of non-conducting material. In the prior art, these are preferably chosen to be alumina so that these make up first and second alumina regions 54, 56. A band of masking material 48 such as photoresist is then deposited to protect the material of the sensor material region 42, and first and second dielectric material regions 44, 46 from being cut away during shaping processes such as ion milling. The width of the band of masking material 48 establishes the eventual width of the read head sensor 40 and thus the trackwidth 50. The width of the sensor material region 42 establishes the stripe height 52 of the sensor 40.

The difficulty arises when the exposed portions of sensor material region 42 and first and second alumina regions 54, 56 are subjected to ion milling, since the sensor material 42 and the first and second alumina regions 54, 56 have different milling rates, the sensor material 42 is removed faster than the alumina 54, 56. A series of views of cross-sections of the sensor region 42, as taken through line 6-6 in FIG. 5, and the first alumina region, as taken through line 7-7 of FIG. 5 are shown side-by-side for comparison in FIGS. 6-15. Comparable stages of fabrication of a sensor layer stack 58 in the sensor region 42 are shown in FIGS. 6, 8, 10, 12 and 14, and of an alumina stack 60 in the alumina region 54 in FIGS. 7, 9, 11, 13 and 15 respectively. Since the relative heights of the layers at each stage of fabrication is at issue, the bottom of the sensor layer stack 58 and the bottom of the alumina layer stack 60, are aligned in the pairs of drawings.

In the first stage, FIG. 6 shows the layer of sensor material 62, protective layer 64, preferably of material such as Diamond-like carbon (DLC), and then a layer of masking material 48, and FIG. 7 shows the layer of alumina 66, protective layer 64 and masking material 48.

Next Reactive Ion Etching (RIE) is performed to shape the protective layer material 64 in both FIGS. 8-9.

FIGS. 10-11 show the effect of ion milling, which narrows the sensor material 62 to the dimensions of the mask material 48 and establishes the trackwidth 50. FIG. 11 shows that due to its slower milling rate, the alumina layer remaining 68 may be 200-300 Å thick, as compared to a typical sensor 62 thickness of 400 Å.

FIGS. 12 and 13 show the effects of depositing the hard bias/leads material 70 on both the sensor material region 42, and the first alumina region 54. The hard bias/leads are used to magnetically bias magnetic domains in certain layers of the sensor material 42, and also to supply electric current to the sensor 40. Therefore, in order to maintain the function of the sensor, it is important that the leads are not shorted together. The hard bias/leads material 70 is deposited in a blanketing layer over both the sensor material region 42 and alumina regions 54, 56, (see FIG. 5). In the sensor region 42, the height of the masking material 48 is such that the hard bias/leads material 70 on the masking material 48 is removed vertically far enough from the material 72 deposited on the sides of the sensor that a gap 74 remains, so that three separate elements are formed, namely a first side lead 76 and second side lead 78, and a hard bias/lead material cap 80.

However in the alumina region 54, shown in FIG. 13, since the residual step 68 remains, the hard bias/leads material 70 is raised vertically by this step height 82, as shown by the two set of arrows 82. Consequently, there is not enough vertical displacement of the side leads 76 and the cap 80, so that there is no gap, and side material 72 commonly forms bridges 84 between them. First and second leads 76, 78 are thus no longer electrically isolated, and are thus shorted together.

The next process, shown in FIGS. 14 and 15, is a CMP (Chemical Mechanical Polishing) assisted liftoff. As shown in FIG. 14, this is intended to remove the cap 80 and the masking material 48 from the sensor 62, leaving the first and second leads 76, 78 electrically isolated from each other, except for the conductive path through the sensor 62, as it should be. However, as shown in FIG. 15, in the alumina region 54, the masking material 48 has been unintentionally encapsulated by the hard bias/lead layer 70, which is not removed by the CMP assisted process. Thus this leaves an electrical short between the first and second side leads 76, 78, which must be removed if the sensor 62 is to function properly.

Thus there is a need for a fabrication method which prevents the formation of bridges in hard bias/lead material layer which produces electrical short circuits in disk drive read sensors.

SUMMARY OF THE INVENTION

A preferred embodiment of the present invention is a method for fabricating a read head for a hard disk drive having a read head sensor and a hard bias/lead layer. The method includes depositing a strip of sensor material in a sensor material region, and depositing strips of fast-milling dielectric material in first and second fast-milling dielectric material regions adjacent to the sensor material region. Next, a protective layer is deposited on the sensor material region and the first and second fast-milling material regions. A layer of masking material is deposited on the strip of sensor material and the strips of fast-milling dielectric material to provide masked areas and exposed areas. A shaping source, such as an ion milling source, is provided which shapes the exposed areas. Hard bias/lead material is then deposited on the regions of sensor material and fast-milling dielectric material to form first and second leads and a cap on each of these regions. The cap of hard bias/lead material and the masking material is then removed from each of these regions.

It is an advantage of the present invention that the production of short circuits between hard bias/leads is minimized, thus increasing production yields.

It is another advantage that photoresist is not encapsulated by hard bias/lead material and is thus more easily removed.

It is a further advantage of the present invention that more uniform topography is produced, thus simplifying subsequent processing steps.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIGS. 6-15 show parallel pairs of cross-section views of the sensor region and the alumina region of the prior art at various stages of fabrication; and FIGS. 16-25 show parallel pairs of cross-section views of the sensor region and the alumina region of the present invention at various stages of fabrication.

DETAILED DESCRIPTION OF THE PREFERRED EMBODIMENTS

The preferred embodiment of the present invention is a method of fabrication of read sensors which utilizes fast-milling dielectric material which more closely matches the milling rate of sensor material. The present invention is also a disk drive read head having milling of the sensor layers above the dielectric layer, and a method for producing this read head.

Figure 1:
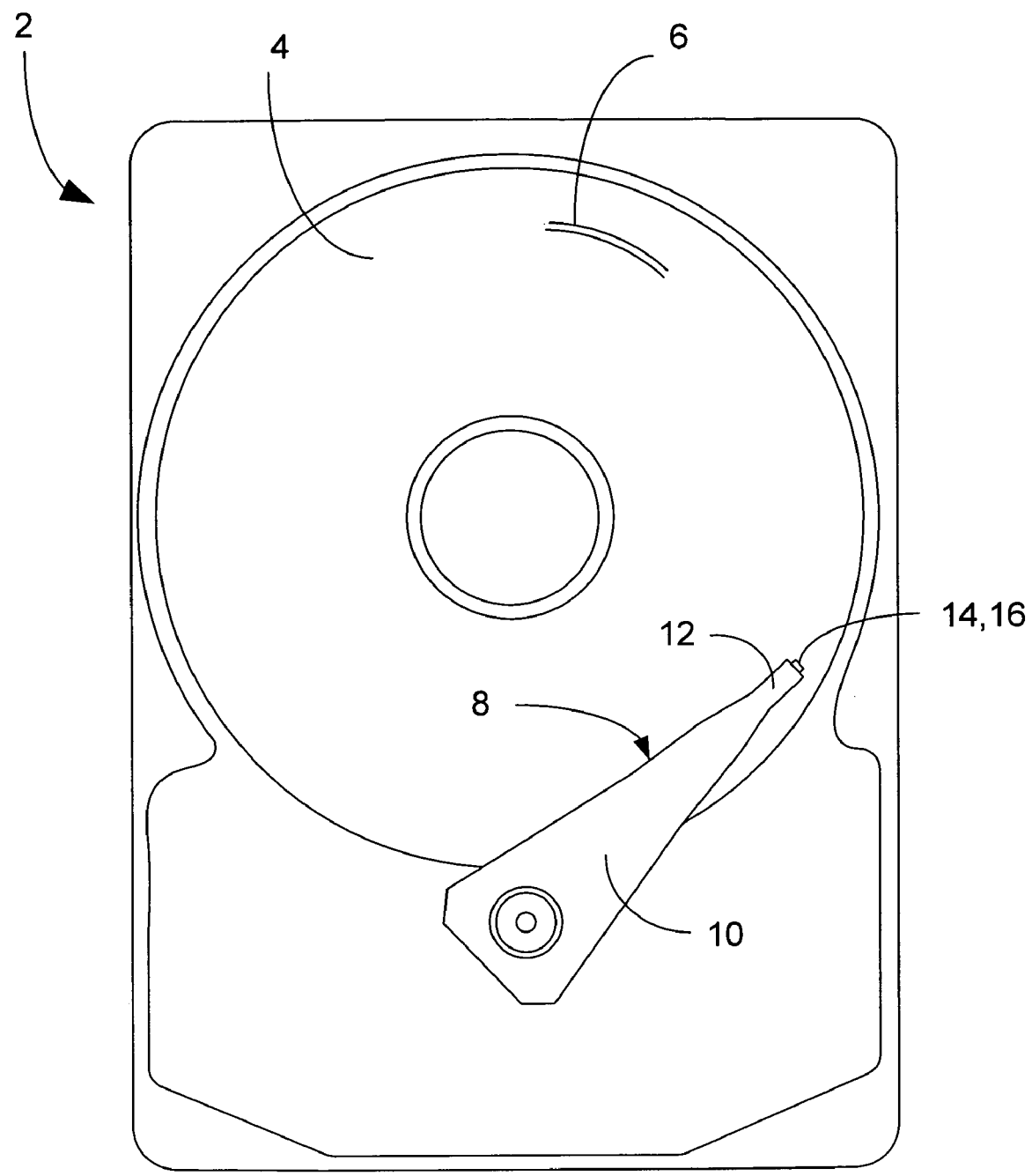
FIG. 1 shows a top plan view of an exemplary disk drive.

A hard disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
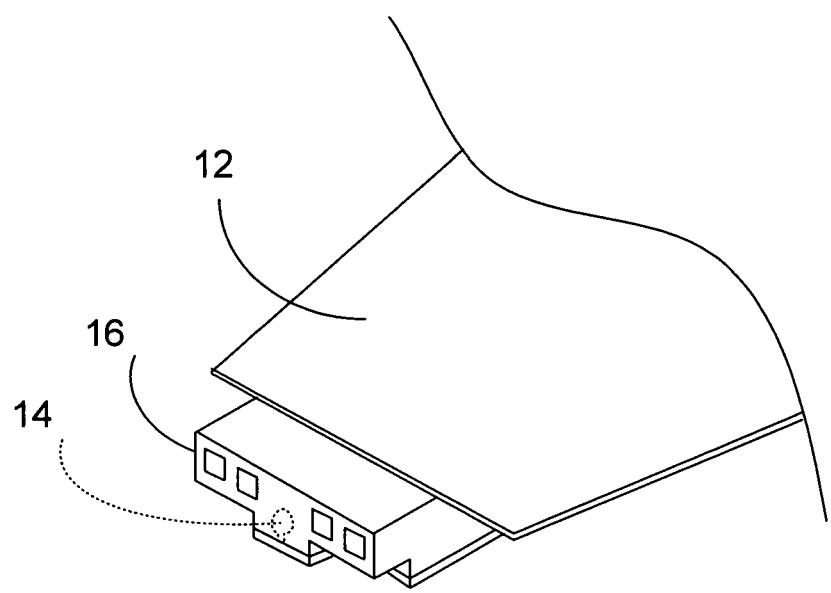
FIG. 2 illustrates a perspective view of view of an exemplary slider and suspension.
Figure 3:
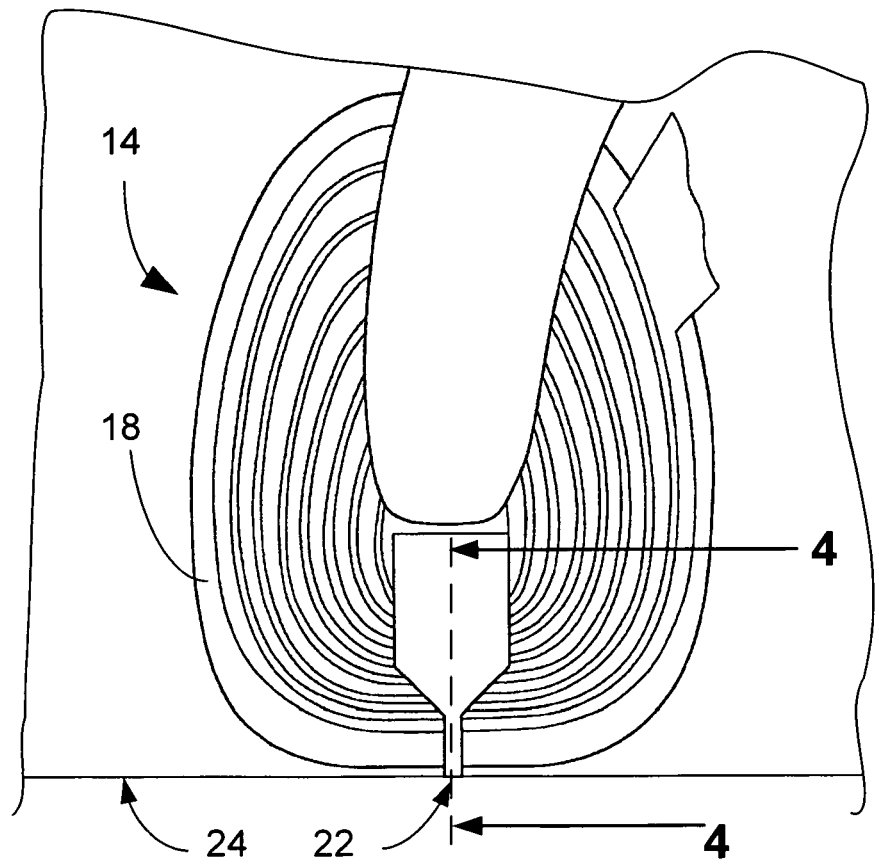
FIG. 3 shows a top plan view of an exemplary read/write head.

FIG. 2 shows a slider 16 in more detail being supported by suspension 12. The magnetic head 14 is shown in dashed lines, and in more detail in FIGS. 3 and 4. The magnetic head 14 includes a coil 18 and P1 pole, which also acts as S2 shield, thus making P1/S2 20. P1/S2 may also be made as two discrete layers. The second pole P2 22 is separated from P1/S2 by write gap 23.

The read sensor 40 is sandwiched between the first shield S1 30 and the second shield P1/S2 20. There is generally included an insulation layer 32 between the rest of the length of S1 30 and P1/S2 20. The magnetic head 14 flies on an air cushion between the surface of the disk 4 and the air bearing surface (ABS) 24 of the slider 16. The write head portion 26 and the read head portion 28 are generally shown, with the read head sensor 40 and the ABS 24.

There are two configurations of read head in common use in the industry today. These are called Current Perpendicular to the Plane (CPP), and Current In the Plane (CIP). In the CPP configuration, Shield S1 and P1/S2 are made of conducting material which act as electrodes supplying current to the read sensor which lies between them.

The present invention uses a CIP configuration, in which the current flows from side to side through the elements. For CIP read heads, the read sensor 40 is generally sandwiched between two insulation layers, usually designated G1 34 and G2 36 which are made of non-conductive material, to keep the circuit from shorting out.

Figure 4:
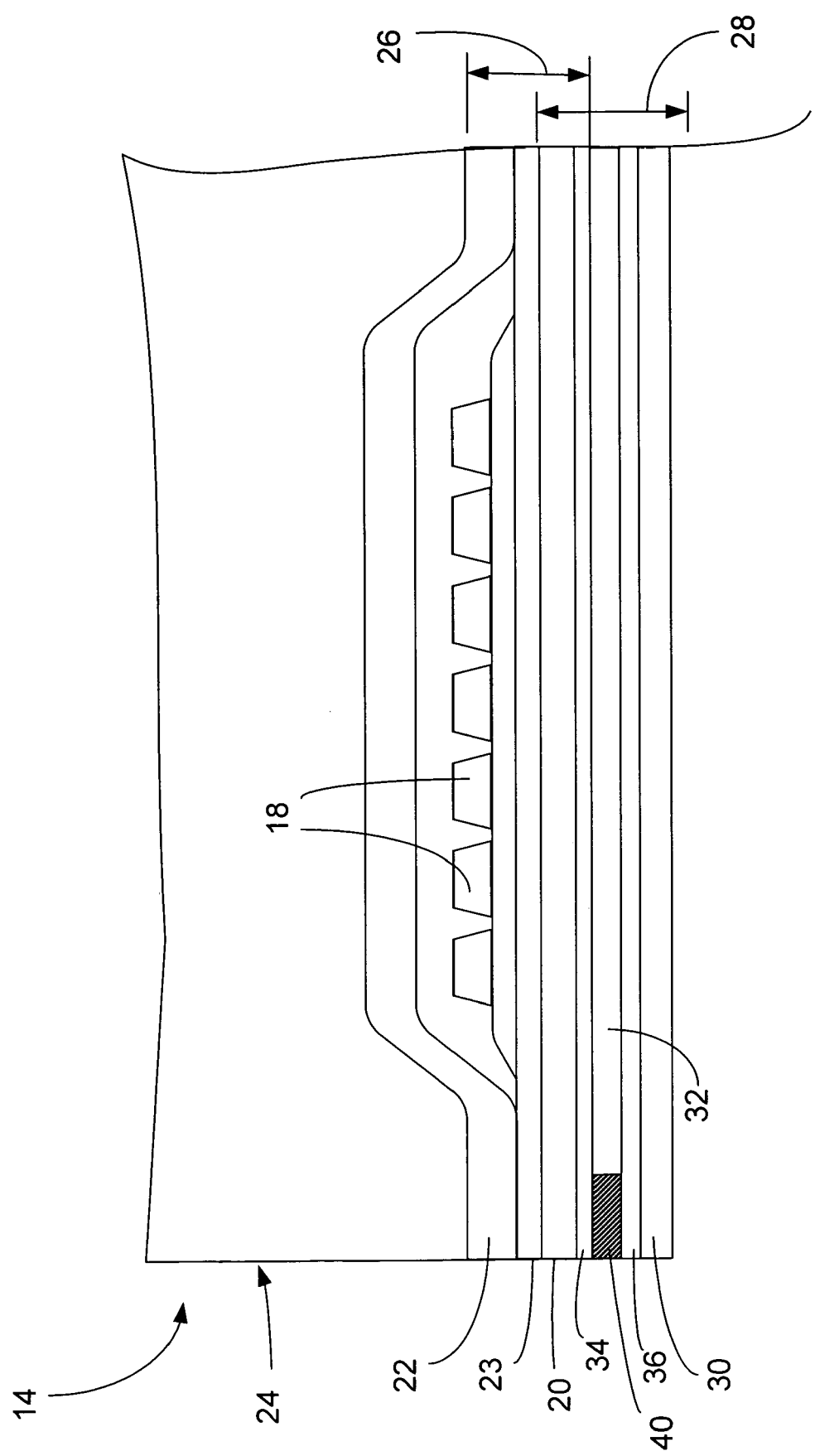
FIG. 4 is a cross-section view of an exemplary read/write head.

Note that this structure is strictly for illustration only, and one skilled in the art will appreciate that sensor structures can vary dramatically from the one shown in FIG. 4, the methodology of the present invention being applicable to formation of all such heads.

Figure 5:
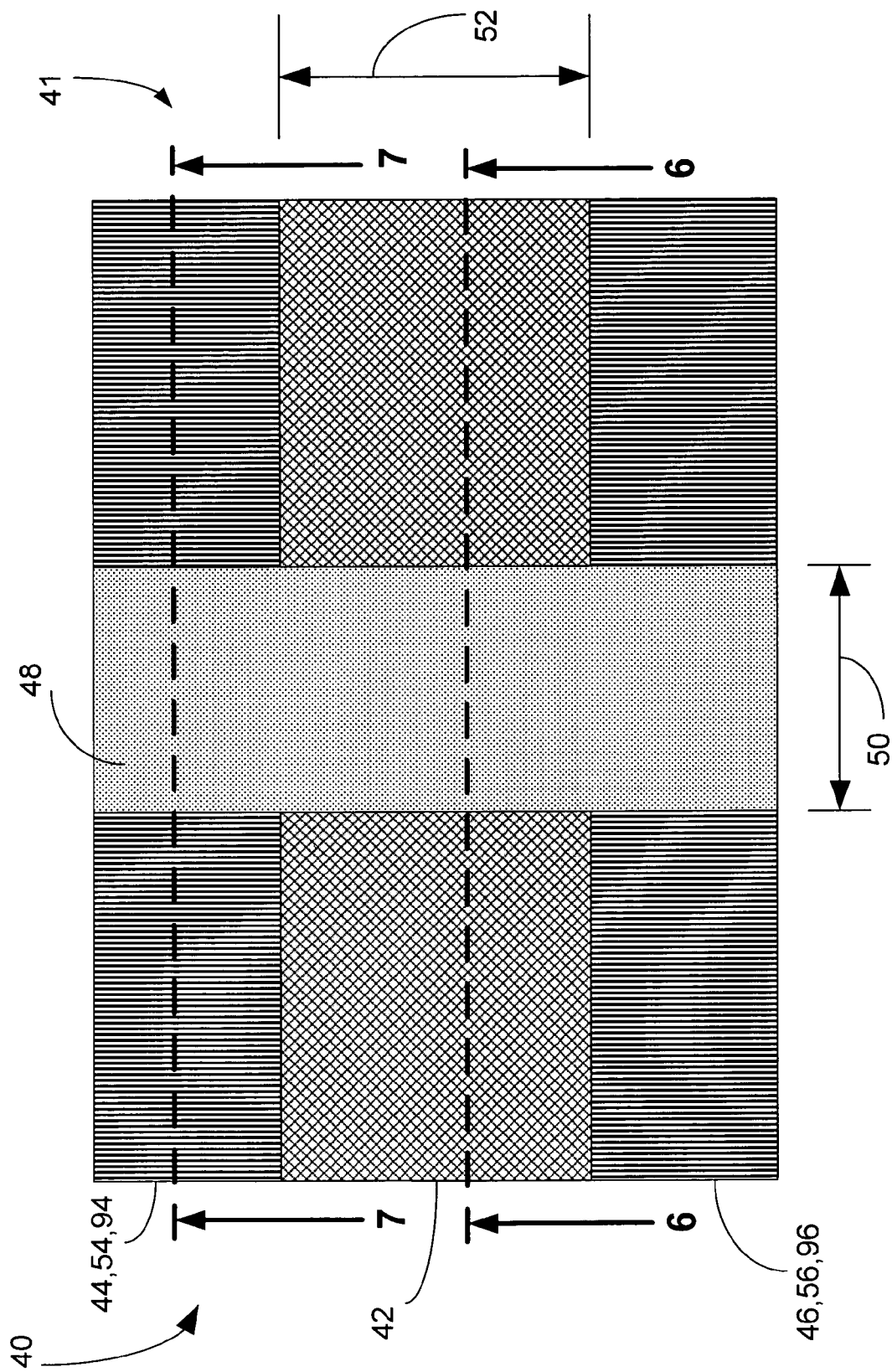
FIG. 5 shows a top plan view a portion of a read sensor showing strips of alumina and sensor material and photoresist material.

The novelty of the present invention is best understood in comparison to processes of the prior art, as discussed above. A common problem with the fabrication of sensors of the prior art is illustrated in FIGS. 5-15. The sensor is typically formed of a stack of layers which are generally formed as a region of magnetic material bounded by strips of dielectric or insulating materials. FIG. 5 shows a top plan view of a portion of a wafer 41 as it is being prepared for shaping into a sensor 40. The sensor material region 42 is shown to be bounded by a first dielectric material region 44 and a second dielectric material region 46. These first and second dielectric material regions 44, 46 are chosen to be of non-conducting material. In the prior art, these are preferably chosen to be alumina so that these make up first and second alumina regions 54, 56. A band of masking material 48 such as photoresist is then deposited to protect the material of the sensor material region 42, and first and second dielectric material regions 44, 46 from being cut away during shaping processes such as ion milling. The width of the band of masking material 48 establishes the eventual width of the read head sensor 40 and thus the trackwidth 50. The width of the sensor material region 42 establishes the stripe height 52 of the sensor 40.

The difficulty arises when the exposed portions of sensor material region 42 and first and second alumina regions 54, 56 are subjected to ion milling, since the sensor material 42 and the first and second alumina regions 54, 56 have different milling rates, the senor material 42 being removed faster than the alumina 54, 56. A series of views of cross-sections of the sensor region 42, as taken through line 6-6 in FIG. 5, and the first alumina region, as taken through line 7-7 of FIG. 5 are shown side-by-side for comparison in FIGS. 6-15. Comparable stages of fabrication of a sensor layer stack 58 in the sensor region 42 are shown in FIGS. 6, 8, 10, 12 and 14 and of an alumina stack 60 in the alumina region 54 in FIGS. 7, 9, 11, 13 and 15 respectively. Since the relative heights of the layers at each stage of fabrication is at issue, the bottom of the sensor layer stack 58 and the bottom of the alumina layer stack 60, are aligned in the pairs of drawings.

Figure 6:
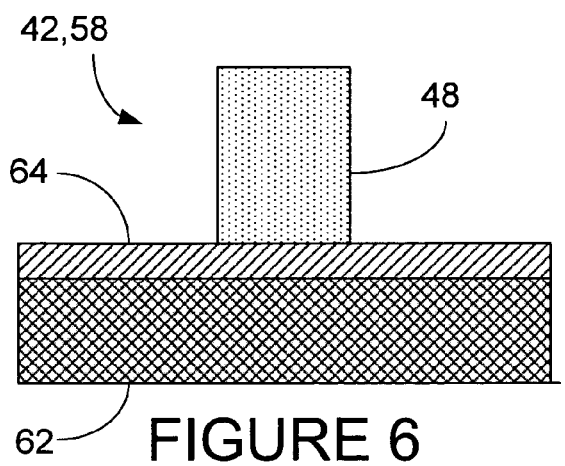
Figure 7:
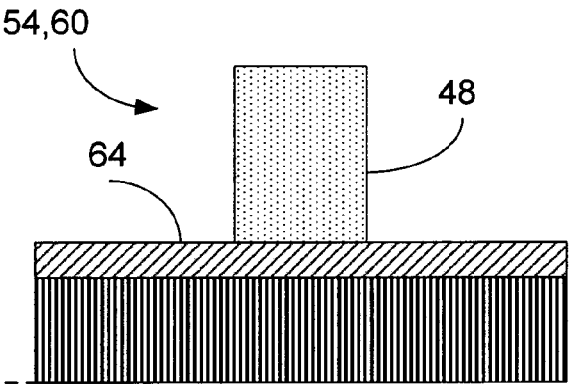

In the first stage, FIG. 6 shows the layer of sensor material 62, protective layer 64, preferably of material such as DLC, and then a layer of masking material 48, and FIG. 7 shows the layer of alumina 66, protective layer 64 and masking material 48.

Figure 8:
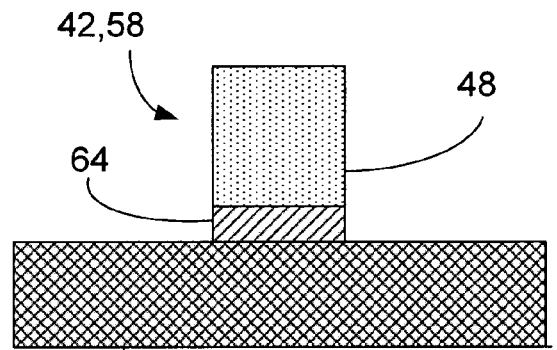
Figure 9:
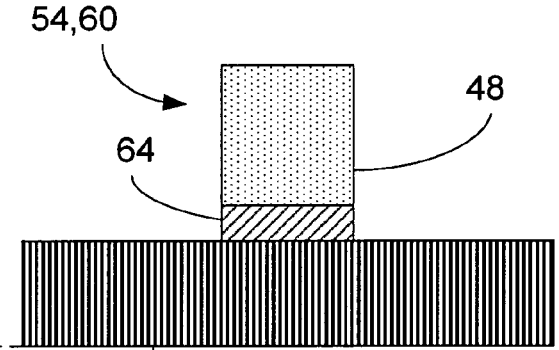

Next Reactive Ion Etching (RIE) is performed to shape the protective layer material 64 in both FIGS. 8-9.

Figure 10:
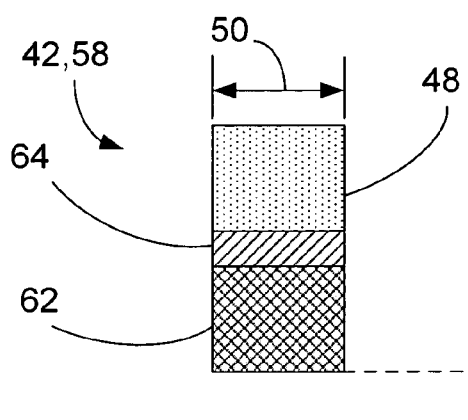
Figure 11:
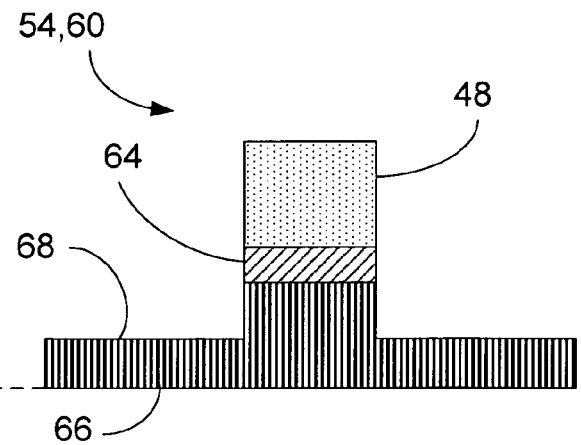

FIGS. 10-11 show the effect of a shaping operation such as ion milling, which narrows the sensor material 62 to the dimensions of the mask material 48 and establishes the trackwidth 50. FIG. 11 shows that due to its slower milling rate, the alumina layer remaining 68 may be 200-300 Å thick, as compared to a typical sensor 62 thickness of 400 Å.

FIGS. 12 and 13 show the effects of depositing the hard bias/leads material 70 on both the sensor material region 42, and the first alumina region 54. The hard bias/leads are used to magnetically bias magnetic domains in certain layers of the sensor material 42, but also to supply electric current to the sensor 40. Therefore, in order to maintain the function of the sensor, it is important that the leads are not shorted together. The hard bias/leads material 70 is deposited in a blanketing layer over both the sensor material region 42 and alumina regions 54, 56, (see FIG. 5). In the sensor region 42, the height of the masking material 48 is such that the hard bias/leads material 70 on the masking material 48 is removed vertically far enough from the material 72 deposited on the sides of the sensor that a gap 74 remains, so that three separate elements are formed, namely a first side lead 76 and second side lead 78, and a hard bias/lead material cap 80.

However in the alumina region 54, shown in FIG. 13, since the residual step 68 remains, the hard bias/leads material 70 is raised vertically by this step height 82, as shown by the two set of arrows. Consequently, there is not enough vertical displacement of the side leads 76 and the cap 80, so that there is no gap, and side material 72 commonly forms bridges 84 between them. First and second leads 76, 78 are thus no longer electrically isolated, and are thus shorted together.

The next process, shown in FIGS. 14 and 15, is a CMP (Chemical Mechanical Polishing) assisted liftoff. As shown in FIG. 14, this is intended to remove the cap 80 and the masking material 48 from the sensor 62, leaving the first and second leads 76, 78 electrically isolated from each other, except for the conductive path through the sensor 62, as it should be. However, as shown in FIG. 15, in the alumina region 54, the masking material 48 has been unintentionally encapsulated by the hard bias/lead layer 70, which is not removed by the CMP assisted process. Thus this leaves an electrical short between the first and second side leads 76, 78, which must be removed if the sensor 62 is to function properly.

In contrast, FIGS. 16-25 show the method of fabrication of the present invention. In place of alumina, a dielectric material having a milling rate more closely comparable to that of the sensor material is used. This material shall be referred to, purposes of this discussion, and in FIGS. 16-25, which follow, as fast-milling dielectric 90. Ideally, the milling rate of this fast milling dielectric would exactly match that of the sensor material. However, an exact match is not necessary, as long as the milling rates are close enough that a step height from residual material is small enough that bridges do not form in the hard bias/lead material which then interfere with the CMP assisted removal of the masking material and excess hard bias/lead material. It is estimated that a step height of 50 A or less in the residual dielectric, which might be achieved through either full or partial mill, including a combination of mill angles, will provide satisfactory results. A partial list of materials which may be used include $Ta_2O_5$, $SiO_2$, $Si_3N_4$, AlN, variable compositions of Al—Si—O—N, $HfO_2$, $ZrO_2$, and $Hf(1-x)Si_xO_2$. It will be understood by those skilled in the art that this list is not to be considered limiting and that many other materials would fit the definition of fast-milling dielectrics.

In a similar manner to that shown before, FIG. 5 will be used to show the regions of sensor material, and a first region of fast-milling dielectric material 94 and second region of fast-milling dielectric material 96. As before, a series of views of cross-sections of the sensor region 42, as taken through line 6-6 in FIG. 5, and the first fast-milling material region 94, as taken through line 7-7 of FIG. 5 are shown, this time in FIGS. 16-25. Comparable stages of fabrication of a sensor layer stack 58 in the sensor region 42 are shown in FIGS. 16, 18, 20, 22 and 24 and of a fast-milling dielectric stack 92 in the first fast-milling dielectric material region 94 in FIGS. 17, 19, 21, 23 and 25 respectively. Once again, the bottom of the sensor layer stack 58 and the fast-milling dielectric stack 92, are level in the pairs of drawings.

Figure 16:
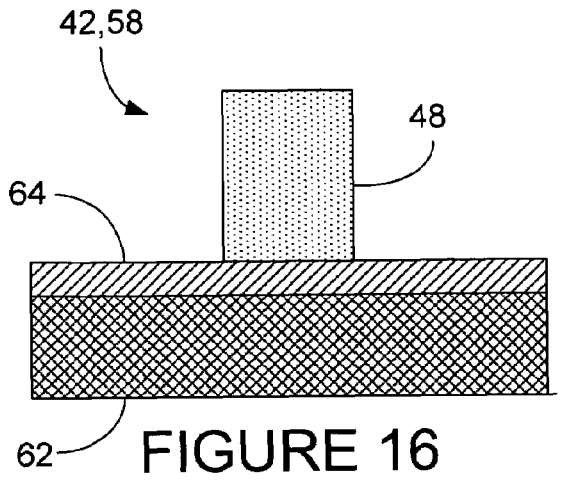
Figure 17:
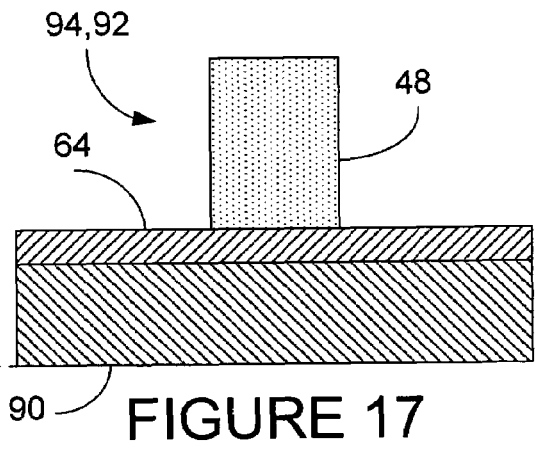

In the first stage, FIG. 16 shows the layer of sensor material 62, protective layer 64, preferably of material such as DLC, and then a layer of masking material 48, and FIG. 17 shows the fast-milling dielectric stack 92, including the layer of fast-milling dielectric material 90, protective layer 64 and masking material 48.

Figure 18:
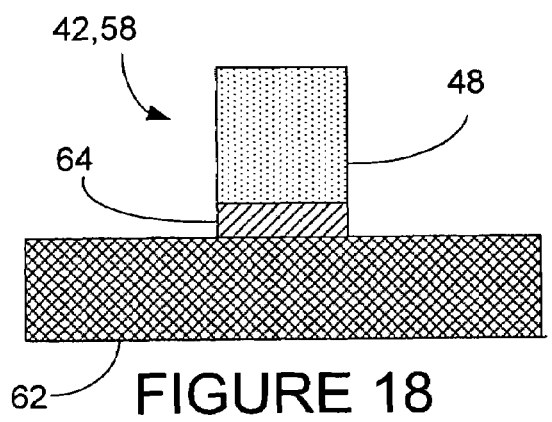
Figure 19:
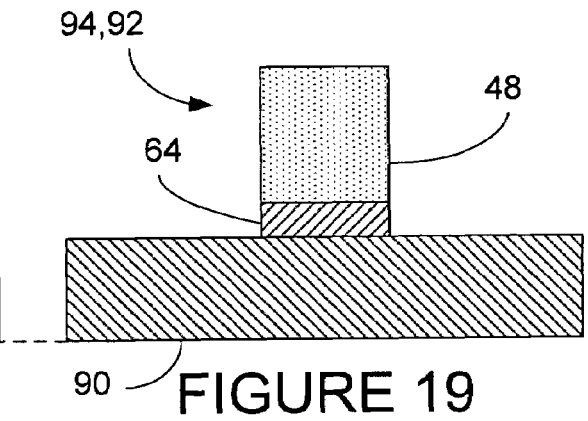

Next Reactive Ion Etching (RIE) is performed to shape the protective layer material 64 in both the sensor layer stack 58 and the fast-milling dielectric stack 92 as seen in FIGS. 18-19.

Figure 20:
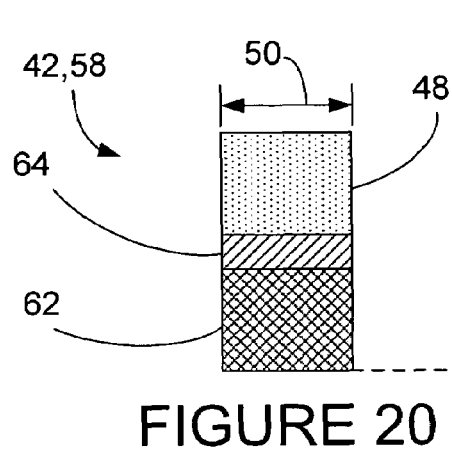
Figure 21:
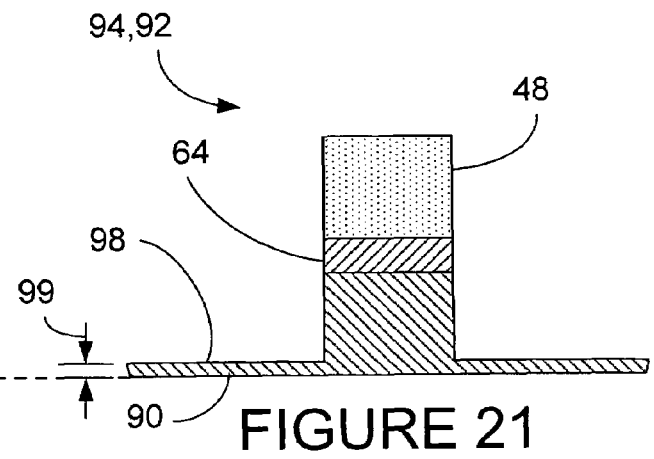

FIGS. 20-21 show the effect of ion milling, using any of a variety of ion beam etch tools, and which narrows the sensor material 62 to the dimensions of the mask material 48 and establishes the trackwidth 50. FIG. 21 shows that the fast-milling dielectric stack 92, due to its faster, but not exactly matching milling rate, still retains a reduced residual step 98 having a residual step height 99 which is 10-20 Å in height, compared to typical thickness of 400 Å of the sensor material 62. As referred to above, it is estimated that a step height of 50 A or less in the residual dielectric will provide satisfactory results. This also compares favorably with a height of 100-200 Å of the residual step 68 of the prior art (see FIG. 13).

FIGS. 22 and 23 show the effects of depositing the hard bias/leads material 70 on both regions 42, 94 (see FIG. 5). In the sensor region 42, the height of the masking material 48 is such that the hard bias/leads material 70 on the masking material 48 is removed vertically far enough from the material 72 deposited on the sides of the sensor 62 that a gap 74 remains, so that three separate elements are formed, namely a first side lead 76 and second side lead 78, and a hard bias/lead material cap 80. In comparison, in the fast-milling dielectric stack 92 of the present invention, the reduced residual step 98 has a residual step height 99 which is small enough that there is still enough distance that the material 72 deposited on the sides of the sensor does not join with the material in the first side lead 76 and second side lead 78, and a gap 74 remains. Now there are three separate elements are formed, namely a first side lead 76 and second side lead 78, and a hard bias/lead material cap 80, as in the sensor layer stack 58.

When CMP assisted liftoff is completed, as shown in FIGS. 24 and 25, the cap 80 and the masking material 48 are removed from both the sensor 62, and the fast-milling dielectric stack 92 leaving both sets of first and second leads 76, 78 electrically isolated from each other, except for the conductive path through the sensor 62, as it should be.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating a read head for a hard disk drive having a read head sensor of CIP configuration and a hard bias/lead layer, said method comprising:
   A) depositing a strip of sensor material in a sensor material region;
   B) depositing strips of fast-milling dielectric material chosen from a group consisting of $Ta_2O_5$, $SiO_2$, $Si_3N_4$, AlN, variable compositions of Al—Si—O—N, $HfO_2$, $ZrO_2$, and $Hf(1-x)Si_xO_2$ in first and second fast-milling dielectric material regions adjacent to said sensor material region;
   C) depositing a protective layer on said sensor material region and said first and second fast-milling material regions;
   D) depositing a layer of masking material on said strip of sensor material and said strips of fast-milling dielectric material to provide masked areas and exposed areas of said sensor material region and said first and second fast-milling dielectric material regions;
   E) providing a shaping source which shapes said exposed areas;
   F) depositing said hard bias/lead material on said region of sensor material and said first and second regions of fast-milling dielectric material to form first and second leads and a cap on each of these regions;
   G) removing said cap of hard bias/lead material and said masking material from each of these regions.

2. The method of claim 1, wherein:
   after D, said exposed areas of said fast-milling dielectric produce a residual step height of less than 50 Å.

3. The method of claim 1, wherein:
   said masking material of D is photoresist.

4. The method of claim 1, wherein:
   said shaping source of E is ion beam etch tools.

5. The method of claim 1, wherein:
   said sensor material is a plurality of layers of material.

6. A method for fabricating a read head for a hard disk drive having a read head sensor of CIP configuration and a hard bias/lead layer, said method comprising:
   A) forming sensor layer stack a sensor material region;
   B) forming fast-milling dielectric stacks formed from material chosen from a group consisting of $Ta_2O_5$, $SiO_2$, $Si_3N_4$, AlN variable compositions of Al—Si—O—N, $HfO_2$, $ZrO_2$, and $Hf(1-x)Si_xO_2$ in first and second fast-milling dielectric material regions adjacent to said sensor material region;
   C) depositing a layer of masking material said sensor layer stack and said fast-milling dielectric stacks;
   D) shaping said sensor layer stack to desired track width and shaping said fast-milling dielectric stacks to have a reduced residual step height;
   E) depositing said hard bias/lead material on said region of sensor material and said first and second regions of fast-milling dielectric material to form first and second leads and a cap on each of these regions;
   F) removing said cap of hard bias/lead material from each of these regions.

7. The method of claim 6, wherein:
   after D, said exposed areas of said fast-milling dielectric produce a residual step height of less than 50 Å.

8. The method of claim 6, wherein:
   said masking material of D is photoresist.

9. The method of claim 6, wherein:
   said shaping source of E is ion beam etch tools.

10. The method of claim 6, wherein:
    said sensor material is a plurality of layers of material.

11. A magnetic head having a read head for a hard disk drive, comprising:
    a sensor stack which has been shaped into a sensor of CIP configuration;
    stacks of fast-milling dielectric material formed from material chosen from a group consisting of $Ta_2O_5$, $SiO_2$, $Si_3N_4$, AlN, variable compositions of Al—Si—O—N, $HfO_2$, $ZrO_2$, and $Hf(1-x)Si_xO_2$, adjacent to said sensor stack, said stacks of fast-milling dielectric material being shaped along with said sensor stack so that a residual step of step height of 50 Å or less remains in first and second fast-milling dielectric material regions adjacent to said sensor material region; and
    a hard bias/leads layer which has been deposited on said sensor stack and fast-milling dielectric stacks, such that separate first and second leads and a cap are formed due to the reduced residual step height, and said caps are removed by CMP processes, leaving unconnected first and second leads.

* * * * *